(12) United States Patent
Husemann et al.

(10) Patent No.: US 8,258,232 B2
(45) Date of Patent: Sep. 4, 2012

(54) TRANSPARENT ACRYLATE ADHESIVE MASS COMPRISING A FILLER

(75) Inventors: Marc Husemann, Hamburg (DE); Stephan Zöllner, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 10/539,792

(22) PCT Filed: Nov. 24, 2003

(86) PCT No.: PCT/EP03/13166
§ 371 (c)(1),
(2), (4) Date: May 9, 2006

(87) PCT Pub. No.: WO2004/056881
PCT Pub. Date: Jul. 8, 2004

(65) Prior Publication Data
US 2006/0205835 A1    Sep. 14, 2006

(30) Foreign Application Priority Data

Dec. 19, 2002 (DE) ................... 102 59 460

(51) Int. Cl.
| | |
|---|---|
| C08L 33/06 | (2006.01) |
| C08L 33/12 | (2006.01) |
| C08L 31/00 | (2006.01) |
| C08L 31/02 | (2006.01) |
| C08L 31/04 | (2006.01) |
| C08L 33/08 | (2006.01) |
| C08L 33/10 | (2006.01) |
| C08F 8/30 | (2006.01) |
| C08K 3/34 | (2006.01) |

(52) U.S. Cl. ........ 524/560; 524/492; 524/493; 524/555; 524/556; 524/558; 524/563

(58) Field of Classification Search ............... 524/543, 524/556, 555, 599, 558, 560, 563, 492, 493
See application file for complete search history.

(56) References Cited

U.S. PATENT DOCUMENTS

| | | | | |
|---|---|---|---|---|
| 4,217,434 A | * | 8/1980 | Koeble | 524/145 |
| 5,910,522 A | * | 6/1999 | Schmidt et al. | 523/168 |
| 6,417,244 B1 | | 7/2002 | Wellinghoff et al. | |
| 6,958,186 B2 | * | 10/2005 | Husemann et al. | 428/346 |

FOREIGN PATENT DOCUMENTS

| | | |
|---|---|---|
| DE | 195 12 427 A1 | 10/1996 |
| EP | 0 359 430 A2 | 3/1990 |
| EP | 1 081 163 A1 | 3/2001 |
| WO | WO 03/057773 A1 | 7/2003 |

OTHER PUBLICATIONS

Prucker et al; Macromolecules 1998, vol. 31, pp. 602-613.*
Knovel Critical tables; 2003.*
Philipse, et al., "Preparation and Properties of Nonaqueous Model Dispersions of Chemically Modified, Charged Silica Spheres", Journal of Colloid and Interface Science, vol. 128, No. 1, pp. 121-136, Mar. 1, 1989.
Husseman, et al., "Controlled Synthesis of Polymer Brushes by "Living" Free Radical Polymerization Techniques", Maromolecules, vol. 32, pp. 1424-1431, 1999.
Kato, et al., "Polymerization of Methyl Methacrylate with the Carbon Tetrachloride/Dichlorotris-(triphenyphosphine)ruthenium(II)/Methylaluminum Bis(2,6-di-tert-butylphenoxide) Initiating System: Possbility of Living Radical Plymerization[1]", Macromolecules, vol. 28, pp. 1721-1723, 1995.
Wang, et al., "Controlled/"Living"Radical Polymerization. Atom Transfer Radical Polymerization in the Presence of Transition-Metal Complexes", J. Am. Chem. Soc., vol. 117, pp. 5614-5615, 1995.
Bunning, et al., "A Simple Preparation of Small, Smooth Silica Spheres in a Seed Alcosol for Stober Synthesis", Journal of Colloid and Interface Science, vol. 179, pp. 318-321, Article No. 0220, 1996.
International Search Report dated Apr. 23, 2004.
German Search Report dated Jun. 2, 2003.

* cited by examiner

Primary Examiner — Karuna P Reddy
(74) Attorney, Agent, or Firm — Norris McLaughlin & Marcus, P.A.

(57) ABSTRACT

Transparent acrylate pressure-sensitive adhesive comprising a filler, the acrylate-pressure sensitive adhesive comprising a polyacrylate and particles of silicate and/or of silica gel. The particles of silicate and/or of silica gel have a size of not more than 50 nm. The acrylate pressure-sensitive adhesive is prepared by a process in which acrylates and comonomers are polymerized in the presence of at least one organic solvent or in bulk, the particles of silicate and/or of silica gel being mixed in before or after the polymerization.

16 Claims, No Drawings

TRANSPARENT ACRYLATE ADHESIVE MASS COMPRISING A FILLER

This application is a 371 of PCT/EP2003/013166, filed Nov. 24, 2003, which claims foreign priority benefit under 35 U.S.C. §119 of the German Patent Application No. 102 59 460.0 filed Dec. 19, 2002.

The invention relates to a transparent acrylate pressure-sensitive adhesive comprising filler and to a process for preparing the acrylate pressure-sensitive adhesive, and also to a use of the acrylic pressure-sensitive adhesive.

Double-sided pressure-sensitive adhesive tapes coated with pressure-sensitive adhesives (PSA) are being used increasingly for adhesive bonding. Since in many cases it is necessary to ensure long-term bonding even in a relatively wide temperature range, acrylate PSAs are mostly used therein. Besides their very good temperature stability, these acrylate PSAs also possess further advantages too, such as very low aging and weathering under UV light and in an oxygen-containing atmosphere, for example. Very soft acrylate PSAs are very frequently blended with fillers, in order to ensure slitability of the acrylate PSA tape. This is particularly so for automatic dispenser applications. In the majority of cases fibers (glass fibers) are used, and possess a stiffening effect.

As a result of economic and environmental considerations there is a trend at the present time for preparing PSA tapes by the hotmelt process, since in this operation it is possible largely to exclude solvents. Moreover, the production time is shortened as a result of faster coating speeds.

In this operation the incorporation of fibers is much more difficult, since the fibers form agglomerates in the hotmelt or are destroyed by the shearing in the extruder operation.

It is therefore necessary to draw on alternative systems, such as conventional fillers, for example, such as silicates. Although such fillers—in appropriate amount—do have a cohesion-enhancing effect, they lead to a clouding of the acrylate PSA.

There is therefore a need for a filler which behaves transparently in the acrylate PSA yet has the properties that are characteristic of fillers.

It is an object of the present invention, therefore, to prepare transparent acrylate pressure-sensitive adhesive tapes which possess a significantly improved cohesion and also slitability.

This object is achieved by means of an acrylate pressure-sensitive adhesive which comprises a polyacrylate and particles of silicate and/or of silica gel, the particles of silicate and/or of silica gel having a size of not more than 50 nm. The addition of these fillers enhances the cohesion of the PSA. In addition there is an improvement in the slitability of the acrylate PSA tapes.

The addition of silicates as filler can lead to clouding of the acrylate PSA; in order to avoid this effect, very small particles of silicate and/or of silica gel are incorporated into the acrylate PSA. In one preferred embodiment of the invention the particles of silicate and/or of silica gel have a size of not more than 10 to 30 nm. At this particle size there is no clouding of the acrylate PSA.

A further aspect which can lead to clouding of the acrylate PSA is the amount of fillers incorporated. The particles of silicate and/or of silica gel are preferably present with a weight fraction of 0.5 to 25 relative to the unfilled silicate/silica gel.

The acrylate PSA itself must also be a clear substance. In one preferred embodiment of the invention the polyacrylate is obtainable from a comonomer composition comprising a) acrylic acid and methacrylic acid derivatives of the general formula (I), with a fraction of 70 to 100 percent by weight,

$$CH_2=C(R_1)(COOR_2) \qquad (I)$$

where $R_1$=H or $CH_3$ and $R_2$=H or an alkyl chain having 2 to 20 carbon atoms, such as butyl, pentyl, hexyl, heptyl, octyl, isooctyl, 2-methylheptyl, 2-ethylhexyl, nonyl, decyl, dodecyl, lauryl or stearyl(meth)acrylate or (meth)acrylic acid, and b) vinyl compounds comprising functional groups, with a fraction of 0 to 35 percent by weight.

Preferably the vinyl compound is a maleic anhydride, a styrene, a styrene compound, a vinyl acetate, a (meth)acrylamide, an N-substituted (meth)acrylamide, a β-acryloyloxypropionic acid, a vinyl acetic acid, a fumaric acid, a crotonic acid, an aconitic acid, a dimethylacrylic acid, a trichloroacrylic acid, an itaconic acid, a hydroxyalkyl(meth)acrylate, an amino-containing (meth)acrylate, a hydroxyl-containing (meth)acrylate, a 2-hydroxyethyl(meth)acrylate, a 2-hydroxypropyl(meth)acrylate, and/or a 4-hydroxybutyl(meth)acrylate.

With further preference the vinyl compound is a double-bond-functionalized photoinitiator, it being possible for the fraction of the photoinitiator to be from 0 to 30 percent by weight. Using a photoinitiator makes the polymerization easier.

The composition of the monomers is chosen such that the resultant acrylate PSAs possess pressure-sensitive adhesion properties in accordance with D. Satas [Handbook of Pressure Sensitive Adhesive Technology, 1989, VAN NOSTRAND REINHOLD, New York].

As the filler, particles of silicate and/or of silica gel are incorporated into the acrylate PSA. The particles of silicate and/or of silica gel are preferably functionalized with a free-radical initiator. This functionalization leads to a lower level of particle aggregation and hence to a reduced number of conglomerates, which would in turn reduce the transparency of the PSA.

In one preferred embodiment of the invention the particles of silicate and/or of silica gel are surrounded with a chemically bonded polyacrylate coat. A further possibility is to functionalize the particles of silicate and/or of silica gel with a free-radical initiator before adding them to the rest of the acrylate PSA, and of chemically attaching a polymer coat to the particles of silicate and/or of silica gel, in a further step. The polymer coat in question need not be a complete polymer coat; instead, the polymerization on the surface of the particles of silicate and/or of silica gel can be discontinued at an early stage at a point where only small tufts of polymer strands are formed on the surface, but do not yet lead to complete surface coverage.

The polyacrylate of the acrylate PSA and of the particle coating are preferably substantially identical. This allows optimum embedding of the particles of silicate and/or of silica gel. An alternative possibility, however, is to modify the properties of the particles of silicate and/or of silica gel by varying the particle coating, which has consequences for the shear strength of the acrylate PSA.

The object of the invention is further achieved by a process in which the acrylates and comonomers are polymerized in the presence of at least one organic solvent or in bulk, the initiator-functionalized particles of silicate and/or of silica gel being mixed into the polymerization. In one very preferred version the initiator system used for the polymerization of the acrylates and comonomers is identical to the initiator system chemically attached to the surface of the particles of silicate and/or of silica gel.

The polymerization in one preferred embodiment is a free-radical polymerization. This polymerization may be carried out in the presence of an organic solvent or in bulk. The amount of solvent used is as small as possible. The polymerization time, depending on conversion and temperature, amounts to between 6 and 48 h.

In the case of solution polymerization the solvents used include esters of saturated carboxylic acids (such as ethyl acetate), aliphatic hydrocarbons (such as n-hexane or n-heptane), ketones (such as acetone or methyl ethyl ketone), special-boiling-point spirit or mixtures of these solvents. Polymerization initiators employed are customary radical-forming compounds such as, for example, peroxides and azo compounds. Initiator mixtures as well can be used. For the polymerization it is also possible to employ thiols as further regulators for lowering molecular weight and for reducing polydispersity. As polymerization regulators it is possible, for example, to use alcohols and ethers.

The addition of particles of silicate and/or of silica gel improves the slitability of the acrylate PSA. Particles of silicate and/or of silica gel that are too large or in too great a quantity, however, lead to clouding of the acrylate PSA.

In one preferred embodiment of the invention, therefore, particles of silicate and/or of silica gel having a maximum size of 50 nm, in particular from 10 to 30 nm, are mixed in. With further preference, particles of silicate and/or of silica gel are mixed in with a weight fraction of 0.5 to 25 relative to the unfilled silicate/silica gel.

Preferably the particles of silicate and/or of silica gel are functionalized with a free-radical initiator in an upstream operation. This facilitates the silica-gel-surface-induced polymerization by means of which the polyacrylate is chemically attached to the filler and, after the crosslinking step, is incorporated into the acrylate PSA, so that it is no longer possible for any separation phenomenon to occur.

For initiator functionalization it is possible for any free-radical initiators known to the skilled worker to be chemically attached to the particles of silicate and/or of silica gel. The free-radical initiator may be reacted with a silylethoxy, silane or silyl chloride compound in the optional presence of a catalyst or of a basic substance with the particles of silicate and/or of silica gel. Examples of suitable free-radical initiators include peroxides, nitroxide compounds, secondary and tertiary bromides (in general all ATRP initiators [Matyjaszewski et al. Macromolecules 1995, 28, 1721 and Journal of American Chemical Society 1995, 117, 5614]), and azo compounds.

The particles of silicate and/or of silica gel are preferably mixed in before or after the polymerization. For that purpose either the particles of silicate and/or of silica gel functionalized with a free-radical initiator are added to the monomers and then the polymerization is initiated, or the polymer-coated particles of silicate and/or of silica gel are incorporated into the acrylate PSA only after the polymerization. For that purpose the particles of silicate and/or of silica gel are preferably provided in accordance with an above-described operation with a polymer coat (chemically attached), the polyacrylate of the acrylate PSA and of the particle coating being substantially identical. By virtue of the fact that the particles of silicate and/or of silica gel possess a surface of the same material as the rest of the acrylate PSA, in this way as well sedimentation of the particles of silicate and/or of silica gel is prevented or at least retarded.

Besides the conventional and commercially available silica gel, such as Degussa Aerosil 200™, for example, it is also possible to use synthetically coated silicates, such as SOMASIF™ ME 100 from CO-OP Ltd., Japan, for example. Nanospherical silica gels are prepared in accordance with a specification of Philipse [Journal Colloid Interface Science 1989, 128, 121-136] or used Buining [Journal Colloid Interface Science 1996, 179, 318-321]. Nanospherical silica gels are also commercially available, however, from DuPont, under the brand names Ludox® and Synton™, with particle sizes of from 5 to 40 nm. The particle size of the silica gel should be not more than 200 nm and should then be ground further to the desired range.

For preparing the acrylate PSAs it is possible for the inventive polyacrylate/polyacrylate-coated silica gel particle mixtures to be modified in conventional manner. By way of example it is possible to add tackifying resins, such as terpene resins, terpene-phenolic resins, C5, C9 or C5/C9 hydrocarbon resins, pinene resins, indene resins or rosins, alone or in combination with one another. Additionally it is also possible to use plasticizers and aging inhibitors as additives. Moreover, crosslinkers and promoters that are known to the skilled worker can be admixed for the purpose of UV crosslinking. Polyfunctional acrylates as crosslinkers and polymer networks are particularly suitable. In general it is possible to use all of the crosslinkers that are known to the skilled worker for polyacrylates.

The polymerization for preparing the acrylate PSA can be carried out in polymerization reactors which in general are provided with a stirrer, two or more feed vessels, reflux condenser, heating and cooling, and are equipped for operation under $N_2$ atmosphere and superatmospheric pressure.

The acrylate PSA of the invention is preferably crosslinked by short-duration UV irradiation in the range from 200 to 400 nm using commercially customary high-pressure or medium-pressure mercury lamps with an output of, for example, 80 to 160 W/cm. It may be appropriate to adapt the lamp output to the web speed or to shade the web partially, as it runs slowly, in order to lower the thermal load thereon. The irradiation time is governed by the construction and output of the respective lamps.

In a further preferred embodiment of the invention the acrylate PSA is crosslinked by ionizing radiation (e.g., electron beams) or by thermal crosslinking.

Following the polymerization in solvent, the polymerization medium can be removed under reduced pressure, an operation which is carried out at an elevated temperature, in the range from 80 to 150° C. for example. The acrylate PSA can then be used in the solvent-free state, in particular as a hotmelt PSA. In certain cases it is also of advantage to prepare the acrylate PSA of the invention in bulk (without solvent).

The invention is further achieved through the use of the acrylate pressure-sensitive adhesive for producing acrylate pressure-sensitive adhesive tapes.

Transparent acrylate PSA tapes comprising fillers can be produced in a hotmelt operation and by virtue of the fillers possess a significantly improved cohesion and slitability. Fillers used are the above-described particles of silicate and/or of silica gel.

In order to produce an acrylate PSA tape the acrylate PSA can be applied in conventional manner by spreading, spraying, rolling, knifecoating, pouring or extruding, where appropriate at an elevated temperature, generally in the temperature range from 20 to 150° C., to customary backings—for example, to paper, board, wood, metals and polymeric films, made for example from plasticized PVC, polyethylene, polyamides, polyethylene glycol terephthalate or polypropylene. Where solvents are used they can easily be evaporated from the coatings, where appropriate at room temperature or slightly elevated temperatures, generally at temperatures of 20-150° C., in particular of 50-100° C., using, customarily, radiant heaters or hot-air circulation means.

For blending in the polyacrylate hotmelt it is possible to use all of the mixing means that are known to the skilled worker, use being made in particular of twin-screw extruders.

If the polymer-coated particles of silicate and/or of silica gel are not prepared in situ during the polymerization, they may be added in the hotmelt operation prior to coating, at any desired point between the end of polymerization and coating, upstream of the coating nozzle.

The pressure-sensitive adhesion properties after crosslinking are determined using the test methods described in the Experimental Section.

For the purposes of testing, films made of polyethylene glycol terephthalate are coated with an application rate of 50 g/m².

Where dissolved polymers are used for technical adhesive testing, the solvents are evaporated off at 120° C. in a drying oven for 10 minutes.

The invention is illustrated below with reference to examples.

Quantities, fractions and percentages are based on the total amount of the monomers.

The silica gel particles were acquired from DuPont. The series Ludox® was used, with a particle size of 22 nm.

Preparation of the Azo-Functionalized Silyl Compound:

The allyl ester 3 is prepared as shown in reaction scheme (II), by the method of Prucker and Rühe, from the carboxylic acid 1 via the intermediate 2 (Macromolecules 1998, 31, 602-613).

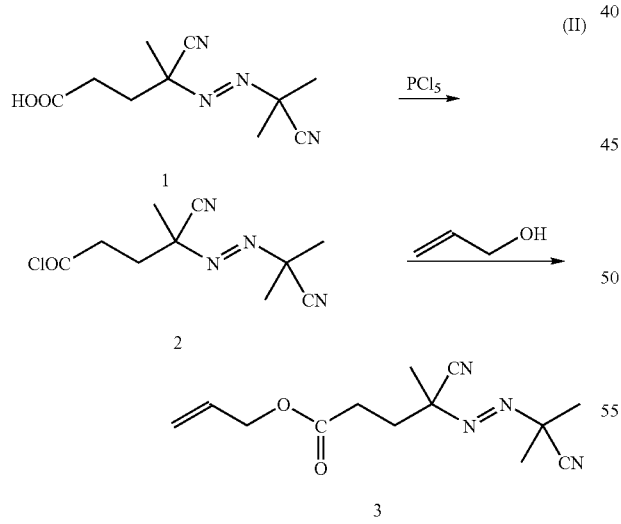

Spectrum of 3: ¹H NMR(CDCl₃, δ in ppm): 5.8-5.9 (m, 1H); 5.2-5.4 (m, 2H); 4.6 (d, 2H); 2.3-2.5 (m, 4H); 1.69, 1.71, 1.73 (s, 3H each signal).

The allyl ester 3 is hydrosilylated to the chlorosilane 4, as shown in reaction scheme (III), by the method of Husemann and Hawker et al. (Macromolecules 1999, 32, 1424-1431).

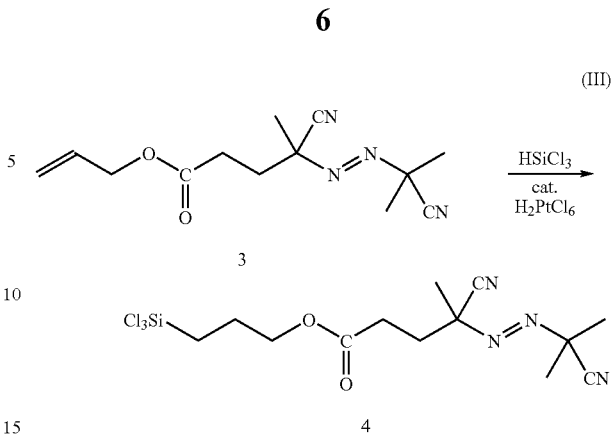

Immobilization of the Chlorosilane 4 to the Silica Gel Particles:

The silica gel particles are reacted by the method of Husemann and Hawker et al. (Macromolecules 1999, 32, 1424-1431).

Test Methods

Shear Strength (Test A):

A strip of the adhesive tape 13 mm wide was laminated onto aluminum foil and then applied to a smooth steel surface which had been cleaned three times with acetone and once with isopropanol. The area of application measured 20×13 mm (length×width). Subsequently the adhesive tape was pressed onto the steel support four times with an applied pressure of 2 kg. At room temperature a 1 kg weight was affixed to the adhesive tape. The holding power times measured are reported in minutes and correspond to the average of three measurements.

180° Bond Strength Test (Test B):

A strip 20 mm wide of an acrylate PSA coated onto polyester was applied to steel plates. The acrylate PSA strip was pressed onto the substrate twice using a 2 kg weight. The adhesive tape was then peeled off immediately from the substrate at 300 mm/min and at an angle of 180°. The steel plates were washed twice with acetone and once with isopropanol. The results are reported in N/cm and are averaged from three measurements. All measurements were carried out at room temperature under climatically standardized conditions.

POLYMERIZATION OF THE REFERENCE EXAMPLES

Example 1

A 250 ml glass reactor conventional for free-radical polymerizations was charged with 0.8 g of acrylic acid (AA), 0.4 g of maleic anhydride (MAA), 19.4 g of n-butyl acrylate (n-BuA), 19.4 g of 2-ethylhexyl acrylate (2-EHA), and 30.0 g of acetone/isopropanol (97:3). After nitrogen gas had been passed through the reactor for 45 minutes with stirring, the reactor was heated to 58° C. and 0.02 g of azoisobutyronitrile (AIBN) was added. Thereafter the external heating bath was heated to 75° C. and the reaction was carried out constantly at this external temperature. After a reaction time of 1 h a further 0.02 g of AIBN was added. After 3 h and after 6 h the batch was diluted with 15.0 g each time of the acetone/isopropanol mixture. After a reaction time of 48 h the reaction was discontinued and the batch was cooled to room temperature. The acrylate PSA was then coated from solution onto a polyethylene terephthalate film (PET film/23 μm, with Fluko primer) at 50 g/m² and dried. The acrylate PSA was crosslinked with 30 kGy EBC and tested according to test methods A and B.

Example 2

The procedure of Example 1 was repeated. The polymerization was carried out using 0.8 g of acrylic acid, 6.0 g of methyl acrylate (MA) and 33.2 g of 2-ethylhexyl acrylate. The amounts of solvent and of initiator were retained. For curing, the unadditized polyacrylate on the polyester backing was treated with a dose of 30 kGy. Analysis was carried out using test methods A and B.

Example 3

The procedure of Example 1 was repeated. The polymerization was carried out using 4.0 g of acrylic acid and 36.0 g of 2-ethylhexyl acrylate. The amounts of solvent and of initiator were retained. For curing, the unadditized polyacrylate on the polyester backing was treated with a dose of 30 kGy. Analysis was carried out using test methods A and B.

Example 4

The procedure of Example 1 was repeated. The polymerization was carried out using 0.8 g of acrylic acid, 34.8 g of 2-ethylhexyl acrylate, 4.0 g of methyl acrylate and 0.4 g of maleic anhydride. The amounts of solvent and of initiator were retained. The polymer was blended with 0.5 weight fractions of a difunctional urethane acrylate (Genomer 4312™ Rahn) and 25 weight fractions of a hydrogenated hydrocarbon resin (Norsolene M1080™, Cray Valley), and with 5 weight fractions of Staybelite® 3-E (Hercules), and the blend was dried and coated at 50 g/m² on the polyester backing. The specimen was EB cured with a dose of 50 kGy. Analysis was carried out using test methods A and B.

Example 5

A 250 ml glass reactor conventional for free-radical polymerizations was charged with 0.8 g of acrylic acid, 0.4 g of maleic anhydride, 19.4 g of n-butyl acrylate, 19.4 g of 2-ethylhexyl acrylate, 2.0 g of azo-initiator-functionalized silica gel and 30.0 g of acetone/isopropanol (97:3). After nitrogen gas had been passed through the reactor for 45 minutes with stirring, the reactor was heated to 58° C. and 0.02 g of azoisobutyronitrile (AIBN) was added. Thereafter the external heating bath was heated to 75° C. and the reaction was carried out constantly at this external temperature. After a reaction time of 1 h a further 0.02 g of AIBN was added. After 3 h and after 6 h the batch was diluted with 15.0 g each time of the acetone/isopropanol mixture. After a reaction time of 48 h the reaction was discontinued and the batch was cooled to room temperature. The acrylate PSA was then coated from solution onto a PET film (23 μm, with Fluko primer) at 50 g/m² and dried. The acrylate PSA was crosslinked with 30 kGy EBC and tested according to test methods A and B.

Example 6

The procedure of Example 5 was repeated. The polymerization was carried out using 0.8 g of acrylic acid, 6.0 g of methyl acrylate, 2.0 g of azo-initiator-functionalized silica gel and 33.2 g of 2-ethylhexyl acrylate. The amounts of solvent and of initiator were retained. For curing, the unadditized polyacrylate on the polyester backing was treated with a dose of 30 kGy. Analysis was carried out using test methods A and B.

Example 7

The procedure of Example 5 was repeated. The polymerization was carried out using 0.8 g of acrylic acid, 6.0 g of methyl acrylate, 4.0 g of azo-initiator-functionalized silica gel and 33.2 g of 2-ethylhexyl acrylate. The amounts of solvent and of initiator were retained. For curing, the unadditized polyacrylate on the polyester backing was treated with a dose of 30 kGy. Analysis was carried out using test methods A and B.

Example 8

The procedure of Example 5 was repeated. The polymerization was carried out using 4.0 g of acrylic acid, 2.0 g of azo-initiator-functionalized silica gel and 36.0 g of 2-ethylhexyl acrylate. The amounts of solvent and of initiator were retained. For curing, the unadditized polyacrylate on the polyester backing was treated with a dose of 30 kGy. Analysis was carried out using test methods A and B.

Example 9

The procedure of Example 5 was repeated. The polymerization was carried out using 0.8 g of acrylic acid, 34.8 g of 2-ethylhexyl acrylate, 4.0 g of methyl acrylate, 5.0 g of azo-initiator-functionalized silica gel and 0.4 g of maleic anhydride. The amounts of solvent and of initiator were retained. The polymer was blended with 0.5 weight fractions of a difunctional urethane acrylate (Genomer 4312™, Rahn) and 25 weight fractions of a hydrogenated hydrocarbon resin (Norsolene M1080™, Cray Valley), and with 5 weight fractions of Staybelite® 3-E (Hercules), and the blend was dried and coated at 50 g/m² on the polyester backing. The specimen was EB cured with a dose of 50 kGy. Analysis was carried out using test methods A and B.

Example 10

An acrylate PSA tape from Example 7 was stored after EB crosslinking at 100° C. for 7 days. Subsequently the surface was investigated and compared with the condition prior to thermal storage.

TABLE 1

TABLE 1 lists the comonomer compositions used in the references (Example 1-4).

| Example | AA [%] | 2-EHA [%] | n-BuA [%] | MA [%] | MAA [%] |
|---|---|---|---|---|---|
| 1 | 2 | 48.5 | 48.5 | 0 | 1 |
| 2 | 2 | 83 | 0 | 15 | 0 |
| 3 | 10 | 90 | 0 | 0 | 0 |
| 4 | 2 | 87 | 0 | 10 | 1 |

The resin in Example 4 was additionally blended with 0.5 weight fractions of Genomer 4312™, 25 weight fractions of Norsolene M 1080™ and 5 weight fractions of Staybelite® Ester 3 E. The results of technical adhesive testing of the reference specimens are summarized in Table 2:

TABLE 2

| Example | EBC dose | BS-steel instantaneous [N/cm] | HP RT 10 N [min] |
|---|---|---|---|
| 1 | 30 kGy | 4.6 | 7250 |
| 2 | 30 kGy | 4.9 | 2720 |
| 3 | 20 kGy | 3.8 | 10000+ |
| 4 | 50 kGy | 6.2 | 250 |

Table 3 shows the results of the silica-gel-modified acrylate PSAs.

TABLE 3

| Example | EBC dose | BS-steel instantaneous [N/cm] | HP RT 10 N [min] |
|---|---|---|---|
| 5 | 30 kGy | 4.4 | +10000 |
| 6 | 30 kGy | 4.8 | +10000 |
| 7 | 30 kGy | 4.4 | +10000 |
| 8 | 20 kGy | 3.6 | +10000 |
| 9 | 50 kGy | 6.0 | 1150 |

The comparison of the technical adhesive properties shows that as a result of the silica gel modification the cohesion is significantly increased. Moreover the bond strength falls only marginally. Example 8 shows likewise that an already very good cohesion is not destroyed by the silica gel modification. Slitting experiments on the product from Example 9 make it clear that the silica gel modification has a beneficial effect on slitability. Slitting experiments revealed that after prolonged standing times the inventive adhesive no longer attaches so greatly to the knife and that, in the course of slitting, the number of picks is reduced, so that there is a significant increase in the optical quality of the PSA tape.

In Example 10 it has been shown that as a result of the chemical attachment of polymers to the surface the silica gel particles are incorporated into the acrylate PSA during EBC crosslinking. This eliminates the tendency toward separation, so that the quality of the acrylate PSA tape remains the same even on prolonged storage. Other additions of filler are mostly not incorporated chemically in the acrylate PSA and therefore possess a tendency to separate at the surface.

The invention claimed is:

1. A transparent acrylate pressure-sensitive adhesive comprising a polyacrylate and a filler, wherein the filler comprises particles of silicate and/or of silica gel, wherein said particles additionally comprise a coating of polyacrylate chemically bonded to a free radical initiator which free-radical initator is chemically bonded to said silicate and/or silica gel, and wherein the polyacrylate-coated particles of silicate and/or of silica gel have a size of not more than 50 nm.

2. The acrylate pressure-sensitive adhesive of claim 1, wherein the polyacrylate-coated particles of silicate and/or of silica gel have a size of 10 to 30 nm.

3. The acrylate pressure-sensitive adhesive of claim 1, wherein the polyacrylate-coated particles of silicate and/or of silica gel are present with a weight fraction of 0.5 to 25 relative to unfilled silicate/silica gel.

4. The acrylate pressure-sensitive adhesive of claim 1, wherein the polyacrylate is obtained from a comonomer composition comprising:
   a) acrylic acid and methacrylic acid derivatives of the formula (I), with a fraction of 70 to 100 percent by weight, $$CH_2=C(R_1)(COOR_2) \qquad (I)$$

where $R_1$=H or $CH_3$ and $R_2$=H or an alkyl chain having 2 to 20 carbon atoms, or stearyl(meth)acrylate or (meth)acrylic acid, and
   b) vinyl compounds comprising functional groups, with a fraction of 0 to 30 percent by weight.

5. The acrylate pressure-sensitive adhesive of claim 4, wherein the vinyl compound is a maleic anhydride, a styrene, a styrene compound, a vinyl acetate, a (meth)acrylamide, an N-substituted (meth)acrylamide, β-acryloyloxypropionic acid, a vinyl acetic acid, a fumaric acid, a crotonic acid, an aconitic acid, a dimethylacrylic acid, a trichloroacrylic acid, an itaconic acid, a hydroxyalkyl(meth)acrylate, an amino-containing (meth)acrylate, a hydroxyl-containing (meth)acrylate, a 2-hydroxyethyl(meth)acrylate, a 2-hydroxypropyl (meth)acrylate, and/or a 4-hydroxybutyl(meth)acrylate.

6. The acrylate pressure-sensitive adhesive of claim 4, wherein the vinyl compound is a double-bond-functionalized photoinitiator.

7. The acrylate pressure-sensitive adhesive of claim 1, wherein the polyacrylate of the pressure-sensitive adhesive and of the polyacrylate-coated particle coating are identical.

8. A process for preparing an acrylate pressure-sensitive adhesive of claim 1, said process comprising polymerizing the acrylates and comonomers in the presence of at least one organic solvent or in bulk, the polyacrylate-coated particles of silicate and/or of silica gel being mixed in.

9. The process of claim 8, wherein polyacrylate-coated particles of silicate and/or of silica gel having a maximum size of 50 nm are mixed in.

10. The process of claim 8, wherein the polyacrylate-coated particles of silicate and/or of silica gel are mixed in with a weight fraction of 0.5 to 25 relative to unfilled silicate/silica gel.

11. The process of claim 8, wherein the polyacrylate-coated particles of silicate and/or of silica gel are mixed in during or after the polymerization.

12. The process of claim 8, wherein the polyacrylate of the acrylate pressure-sensitive adhesive and of the polyacrylate-coated particle coating are identical.

13. The process of claim 8, which further comprises crosslinking the acrylate pressure-sensitive adhesive by UV irradiation in the range from 200 to 400 nm.

14. The process of claim 13, wherein the acrylate pressure-sensitive adhesive is crosslinked by ionizing radiation or by thermal crosslinking.

15. A pressure-sensitive adhesive tape comprising the acrylate pressure-sensitive adhesive of claim 1.

16. A bonding method comprising applying a pressure-sensitive adhesive tape of claim 15 to a substrate.

* * * * *